(12) United States Patent
Thibault et al.

(10) Patent No.: US 6,688,884 B2
(45) Date of Patent: Feb. 10, 2004

(54) ROTARY KILN HEAT EXCHANGER AND METHOD OF ASSEMBLING SAME

(75) Inventors: John Thibault, Wasaga Beach (CA); John Stephansky, Fair Oaks, PA (US); John N. Snyder, Bentleyville, PA (US)

(73) Assignee: Harbison-Walker Refractories Company, Moon Township, PA (US)

( * ) Notice: Subject to any disclaimer, the term of this patent is extended or adjusted under 35 U.S.C. 154(b) by 0 days.

(21) Appl. No.: 10/164,179

(22) Filed: Jun. 6, 2002

(65) Prior Publication Data

US 2003/0228551 A1 Dec. 11, 2003

(51) Int. Cl.[7] ................................................. F27B 7/14
(52) U.S. Cl. ....................................... 432/118; 432/119
(58) Field of Search ................................. 432/103, 110, 432/111, 118, 119; 29/890.03, 890.045

(56) References Cited

U.S. PATENT DOCUMENTS

| | | | | |
|---|---|---|---|---|
| 3,036,822 A | * | 5/1962 | Andersen | 432/118 |
| 3,227,430 A | * | 1/1966 | Vaughan, Jr. | 432/116 |
| 5,330,351 A | | 7/1994 | Ransom, Jr. et al. | 432/103 |
| 6,257,878 B1 | | 7/2001 | Marr et al. | 432/103 |

* cited by examiner

*Primary Examiner*—Gregory Wilson
(74) *Attorney, Agent, or Firm*—Mark Kusner; Michael A. Jaffe

(57) ABSTRACT

Rotary kiln heat exchangers having precast hub and leg assemblies are disclosed. The hub and leg assemblies include interlocking features which secure the heat exchanger components together. A method of installing such heat exchangers in rotary kilns is also disclosed. Installation is relatively fast and simple, and the heat exchangers are capable of withstanding the harsh operating conditions of rotary kilns for extended periods of time.

25 Claims, 8 Drawing Sheets

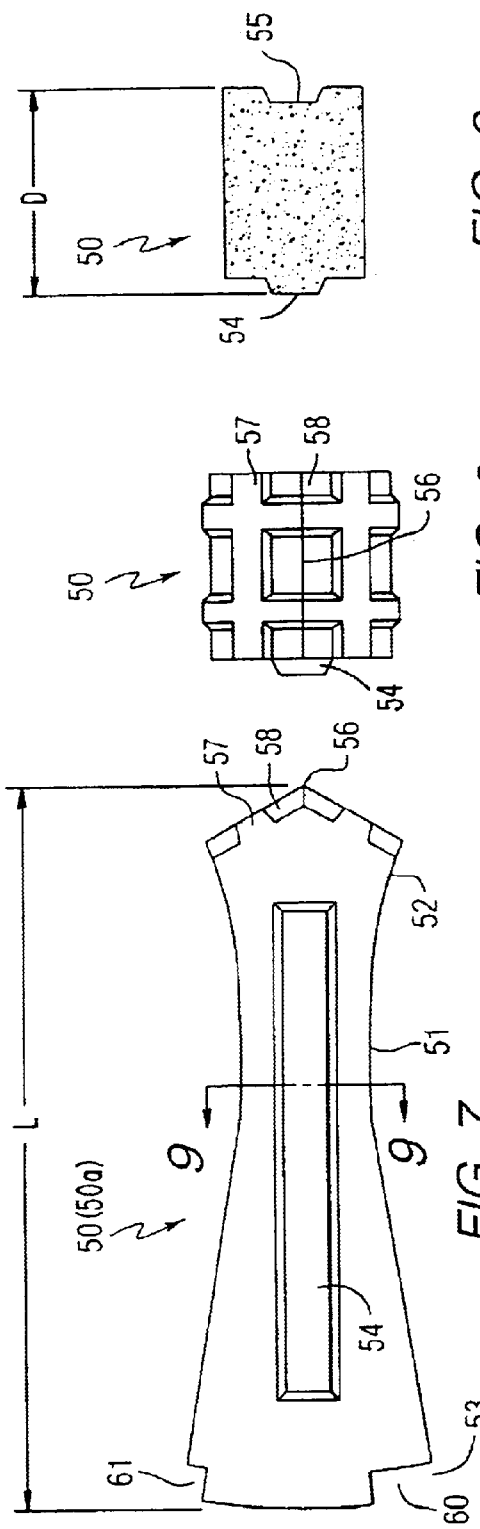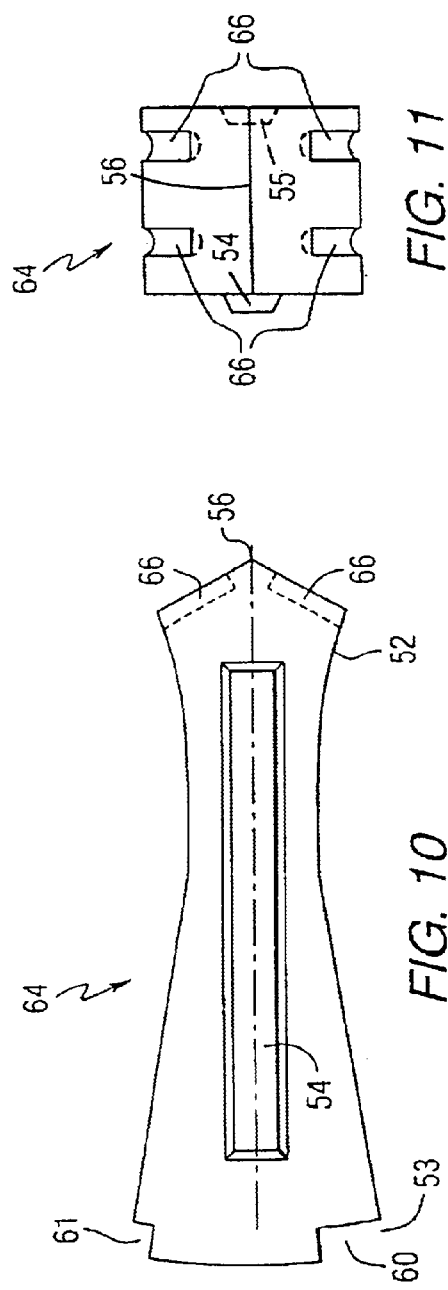

ROTARY KILN HEAT EXCHANGER AND METHOD OF ASSEMBLING SAME

FIELD OF THE INVENTION

This invention relates to rotary kilns, and more particularly relates to heat exchangers installed in rotary kilns.

BACKGROUND INFORMATION

Rotary kilns are long, slightly inclined cylinders used for processing materials such as lime, limestone, dolomite, magnesite, petroleum coke and cement. The material to be treated is introduced at the higher end and heated air flowing counter-current to the material is introduced at the lower end. Rotary kilns generally operate on a twenty-four hour basis for several months between scheduled down periods.

Rotary kilns typically have a refractory brick interior and a steel shell exterior, and some have at least one heat exchanger. The heat exchanger divides the cross section of the kiln into three or more segments to enhance the heat transfer from the gas to the material and improve mixing of the material. A three-segment heat exchanger comprises three spokes or legs which extend from the axial center of the kiln to locations equally spaced around the interior circumference of the steel shell. Commercially available three-segment heat exchangers have been sold under the trademark Trefoil®.

Rotary kiln heat exchangers encounter harsh operating conditions. For example, internal gas temperatures may typically be 1,000 to 3,000° F. in a highly basic atmosphere in a rotary lime kiln, although temperatures outside of this range are possible depending on the particular application. The heat exchanger must take the structural loading and erosion, e.g., from several hundred tons per day of partially calcined rock that slides across or falls against the surfaces of the heat exchanger. Furthermore, the heat exchanger rotates continuously with the kiln, which subjects the components of the heat exchanger to varying compressive and tensile forces. The heat exchanger must also withstand the kiln shell deflection upon revolution over its roller supports.

Conventional rotary kiln heat exchangers are typically from 8 to 16 feet long along the longitudinal kiln axis, depending on the kiln diameter and other parameters, and have spokes or legs typically from 9 to 13.5 inches thick. The heat exchangers are usually formed from individual refractory bricks, although some have been formed in-situ from refractory materials which are cast and cured inside the kiln. Installation of conventional brick heat exchangers is labor-intensive and requires specially skilled artisans. The bricks also require complicated forms specific to a single rotary kiln size to support them during construction. Thus, brick heat exchangers are slow to install and are expensive. In-situ cast refractory heat exchangers also suffer from disadvantages such as premature wear, complicated forms and slower installation than brick.

Some examples of rotary kiln heat exchanger designs are disclosed in U.S. Pat. No. 3,030,091 to Wicken et al., U.S. Pat. No. 3,036,822 to Andersen, U.S. Pat. No. 3,169,016 to Wicken et al., U.S. Pat. No. 3,175,815 to Wicken et al., U.S. Pat. No. 4,846,677 to Crivelli et al, U.S. Pat. No. 5,330,351 to Ransom et al. and U.S. Pat. No. 6,257,878 to Marr et al.

Despite these prior designs, a need still exists for a rotary kiln heat exchanger that is relatively fast and simple to install, and can withstand the harsh operating conditions of rotary kilns for extended periods of time. The present invention has been developed in view of the foregoing, and to address other deficiencies of the prior art.

SUMMARY OF THE INVENTION

An aspect of the present invention is to provide a precast monolithic rotary kiln heat exchanger hub comprising at least one recessed surface configured for engagement with a heat exchanger leg.

Another aspect of the present invention is to provide a rotary kiln heat exchanger hub comprising at least one portion configured for interlocking engagement with a heat exchanger leg, and at least one portion configured for slidable engagement with another heat exchanger leg.

A further aspect of the present invention is to provide a rotary kiln heat exchanger assembly comprising a heat exchanger hub including recesses, and heat exchanger legs received in the heat exchanger hub recesses.

Another aspect of the present invention is to provide a rotary kiln heat exchanger assembly comprising a heat exchanger hub, at least one precast heat exchanger leg interlocked with the trefoil hub, and at feast one precast heat exchanger leg slidably mounted in the trefoil hub.

A further aspect of the present invention is to provide a precast rotary kiln heat exchanger leg comprising an end configured for engagement with a heat exchanger hub.

Another aspect of the present invention is to provide a precast rotary kiln heat exchanger leg comprising a recess and/or protrusion extending along a side surface of the leg for engagement with a protrusion and/or recess of an adjacent heat exchanger leg.

A further aspect of the present invention is to provide a precast rotary kiln heat exchanger leg comprising an end including at least one recess or protrusion for engagement with an interior wall of a rotary kiln.

Another aspect of the present invention is to provide a precast rotary kiln heat exchanger leg comprising an end including means for adjusting the radial location of the heat exchanger in a rotary kiln.

A further aspect of the present invention is to provide a precast rotary kiln heat exchanger leg comprising a flared end for installation adjacent to an interior wall of a rotary kiln.

Another aspect of the present invention is to provide a rotary kiln comprising a refractory lining in the kiln, and a heat exchanger assembly in the kiln including precast heat exchanger legs and a central heat exchanger hub.

A further aspect of the present invention is to provide a rotary kiln comprising a refractory lining in the kiln, and a heat exchanger assembly in the kiln. The heat exchanger assembly includes a heat exchanger hub comprising recesses, and heat exchanger legs received in the heat exchanger hub recesses.

Another aspect of the present invention is to provide a method of installing a heat exchanger in a rotary kiln. The method comprises the steps of providing precast heat exchanger legs, providing a precast heat exchanger hub, and assembling the precast heat exchanger legs and precast heat exchanger hub in the rotary kiln.

A further aspect of the present invention is to provide a method of installing a heat exchanger in a rotary kiln. The method comprises positioning first and second heat exchanger legs in the kiln at initial positions, installing a hub between the first and second legs by moving the first and second legs from their initial positions to installed positions in which the first and second legs are engaged with the hub, and installing a third heat exchanger leg by engaging the third heat exchanger leg with the hub.

These and other aspects of the present invention will be more apparent from the following description.

BRIEF DESCRIPTION OF THE DRAWINGS

FIG. 7 is an elevational view of a heat exchanger leg in accordance with an embodiment of the present invention.

FIG. 8 is a right end view of the heat exchanger leg of FIG. 7.

FIG. 9 is a cross sectional view taken on section 9—9 of the heat exchanger leg shown in FIG. 7.

FIG. 10 is a top view of another heat exchanger leg in accordance with an embodiment of the present invention.

FIG. 11 is a right end view of the heat exchanger leg of FIG. 10.

DETAILED DESCRIPTION

Figure 1:
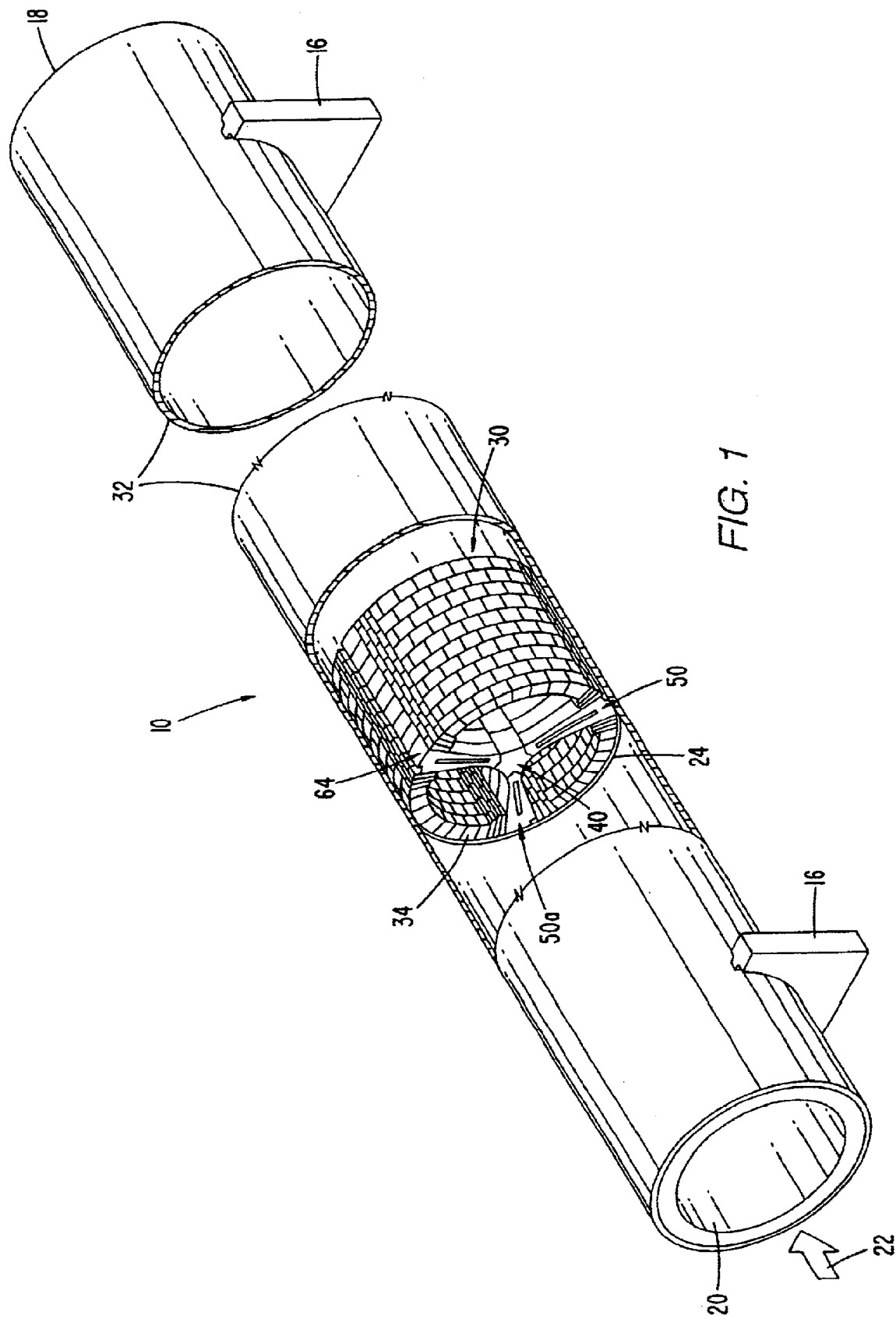
FIG. 1 is an isometric view shown with parts broken away of a conventional rotary kiln having a three-chamber brick heat exchanger.

Referring now to the drawings wherein the showings are for the purpose of illustrating the preferred embodiment of the invention only, and not for the purpose of limiting same, FIG. 1 shows a rotary kiln 10 including a heat exchanger 30 according to the present invention. The rotary kiln 10 has a steel shell 32 which is shown broken away so that the heat exchanger 30 is fully shown. The rotary kiln 10 may be, for example, 100 to 650 feet in length and 3 to 25 feet in diameter. The heat exchanger 30 occupies a longitudinal section in the middle of the kiln 10. The heat exchanger 30 may be, e.g., from 8 to 30 feet in length. Although not shown in FIG. 1, the rotary kiln 10 may contain more than one heat exchanger sections 30.

The rotary kiln 10 is mounted for rotation on trunions 16 with the influent end 18 elevated so that a charge of material to be processed can flow by gravity downstream within the kiln as it rotates. The rotary kiln 10 at the effluent end 20 discharges the dried and/or calcined material. Heated air and gaseous products of combustion, indicated by arrows 22, are introduced at the effluent end 20 and flow in a countercurrent direction to the material being processed. Because the heat exchanger structure is subjected to extremely high torsional forces from the flowing materials charged, various means of construction are used to minimize the effect thereof. A retainer ring 24 may be constructed downstream from the heat exchanger 30. The retainer ring 24 is secured adjacent to a brick lining 34. A shaped refractory brick lining 34 is installed in the kiln 10 between legs 50, 50a and 64 of heat exchanger 30.

Figure 2:
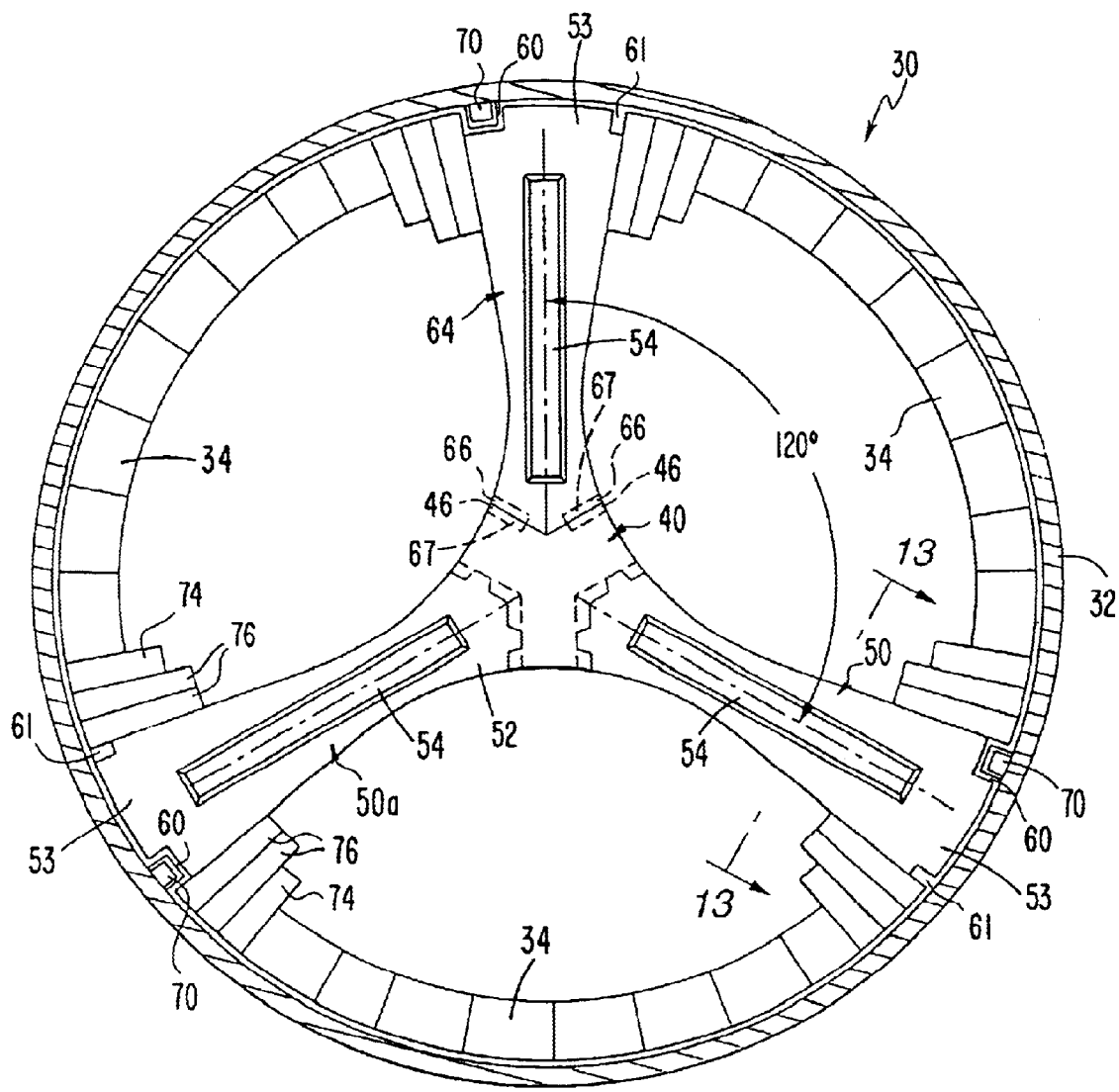
FIG. 2 is an enlarged cross sectional view thereof illustrating a heat exchanger installed in the kiln in accordance with an embodiment of the present invention.
Figure 3:
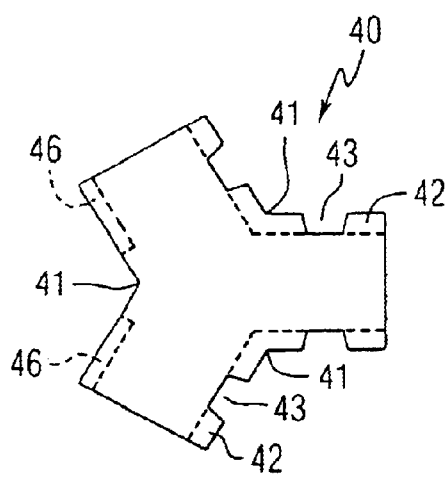
FIG. 3 is a detached elevational view of a heat exchanger hub in accordance with an embodiment of the present invention.
Figure 4:
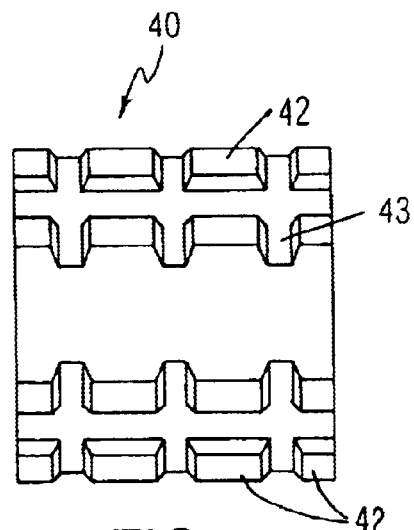
FIG. 4 is a right side view of the heat exchanger hub of FIG. 3.
Figure 5:
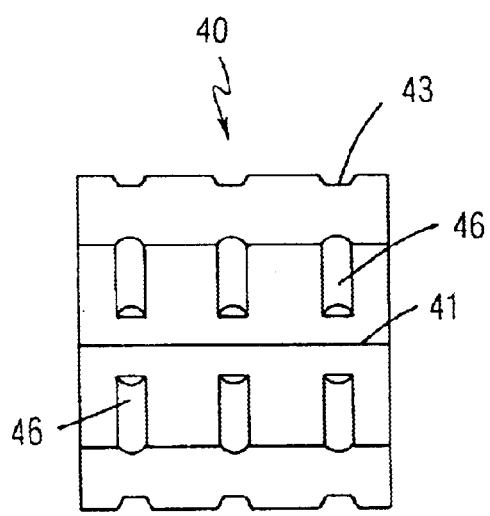
FIG. 5 is a left side view of the heat exchanger hub of FIG. 3.
Figure 6:
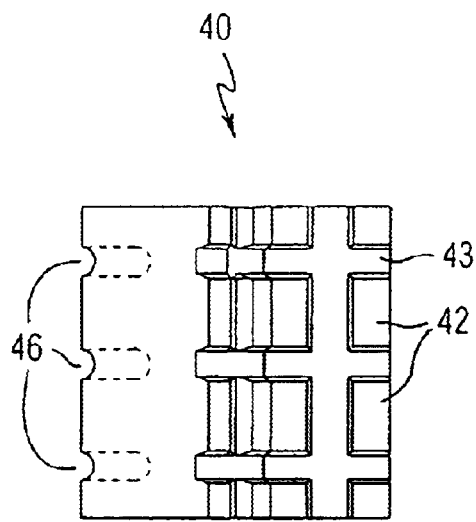
FIG. 6 is a bottom view of the heat exchanger hub of FIG. 3.

Referring now to FIG. 2, a rotary kiln heat exchanger 30 in accordance with a preferred embodiment of the present invention is shown in cross-section. The heat exchanger 30 is installed in rotary kiln shell 32. Refractory brick lining 34 is installed inside the shell 32. The heat exchanger 30 includes a heat exchanger hub 40 engaged with a first heat exchanger leg 50, a second heat exchanger leg 50a, and a third heat exchanger leg 64. In the embodiment shown in FIG. 2, the inner ends of the legs 50, 50a, and 64 fit with an interlocking arrangement within recesses in the hub 40, as more fully described below.

FIGS. 3–6 illustrate details of the hub 40. As shown most clearly in FIG. 3, the hub 40 includes recessed portions 41. In this embodiment, the hub 40 includes three recesses 41 for receiving three heat exchanger legs. Alternatively, the hub 40 could include a different number of recesses depending upon the number of heat exchanger legs that are used.

As shown in FIGS. 3–6, the recessed portions 41 of the hub 40 include several protrusions 42 and recesses 43 which provide for interlocking engagement with the legs 50 and 50a, as more fully described below. As shown most clearly in FIGS. 3 and 5, one of the hub recesses 41 includes pin slots 46 which are arranged for alignment with corresponding pin slots in the leg 64, as more fully described below.

In the embodiment shown in FIGS. 3–6, the hub 40 may be formed of any precast monolithic refractory material having an alumina content of at least 70% by composition, and more preferably, a refractory material having an alumina content of about 80% to about 95% by composition. In one embodiment, hub 40 is formed of a dense, low cement/high alumina (80–85%) castable. The refractory material may optionally be reinforced with materials such as metal fibers, e.g., stainless steel, such as by way of example and not limitation, 430ss, 310ss and/or 304ss. The length of the hub 40 may range from about 10 to about 24 inches, preferably from about 12 to about 18 inches. The thickness of the arms of the hub 40 may range from about 6 to about 15 inches, preferably from about 8 to about 13.5 inches.

FIGS. 7–9 illustrate details of the leg 50. As shown in FIG. 7, the leg 50 includes a relatively narrow mid-section 51, a flared inner end 52, and a flared outer end 53. The flared inner end 52 preferably has a thickness at least 20 percent greater than the thickness of the mid-section 51, more preferably from about 25 to about 40 percent greater. The flared outer end 53 preferably has a thickness at least 40 percent greater than the thickness of the mid-section 51, more preferably from about 55 to about 65 percent greater. The mid-section 51 may have a thickness of from about 6 to about 15 inches, preferably from about 8 to about 13.5 inches. The overall length "L" of the leg 50 may range from about 3 to about 8 feet, preferably from about 4 to about 6.5 feet. The depth "D" of the leg 50 may range from about 8 to about 18 inches, preferably from about 8 to about 12 inches.

As shown most clearly in FIGS. 7 and 9, the leg 50 includes a protrusion 54 which runs along a portion of the length of the leg 50. A recess 55 is provided on the opposite side of the leg 50. When multiple legs 50 are stacked together along the axial length of the rotary kiln, the protrusion 54 of one leg fits within the corresponding recess 55 of the adjacent leg. In this manner, the adjacent leg sections may be interlocked.

As shown most clearly in FIGS. 7 and 8, the inner end 52 of the leg 50 includes an extended tip 56. The extended tip 56 fits within one of the recesses 41 of the hub 40. Protrusions 57 and recesses 58 are provided at the inner end 52 of the leg 50. In accordance with a preferred embodiment of the present invention, the protrusions 57 and recesses 58 provide for interlocking engagement with the corresponding recesses 43 and protrusions 42 of the hub 40.

As shown in FIG. 7, a channel 60 is provided at the outer end 53 of the leg 50. The channel may have any suitable dimensions, e.g., a depth of from about 1.5 to about 3 inches, and a width of from about 3 to about 7 inches. The outer end 53 of the leg includes a slot 61 that is dimensioned to receive a metal member, such as a bar, plate or channel (not shown) on the inner surface of the kiln shell to adjust and lock in place the radial position of the leg 50 within the rotary kiln. As shown in FIG. 2, the channel 60 is shaped to receive a bar 70 running longitudinally along the inner surface of the rotary kiln shell. The channel 60 and bar 70 arrangement helps secure the leg 50 in the desired location with respect to the shell 32. The bar 70 may be made of steel or the like, and is attached to the shell 32 by any suitable means such as welding, mechanical fasteners, etc. Although a single bar 70 is shown in the embodiment of FIG. 2, multiple bars may alternatively be used. In addition to, or in place of, the bars 70 which run longitudinally along the inner surface of the shell 32, other bar configurations may be used, such as bars forming rings around the inner circumference of the shell 32. Basically, any means that adequately secures the leg 50 in the desired position against the interior of the shell 32 may be used.

FIGS. 10 and 11 illustrate details of the leg 64. Many of the features of the leg 64 are the same as the features of the leg 50. However, the inner end 52 of the leg 64 includes pin slots 66 instead of the protrusions and recesses 57 and 58 of the leg 50. The pin slots 66 are arranged such that they line up with corresponding pin slots 46 of the hub 40. As more fully described below, such a pin slot arrangement facilitates installation and securement of the leg 64 in relation to the hub 40.

The legs 50, 50a and 64 are preferably formed of a monolithic refractory material having an alumina content of at least 70% by composition, and more preferably, having an alumina content of about 80% to about 95% by composition. In one embodiment, legs 50, 50a and 64 are formed of a dense, low cement/high alumina (80–85%) castable. The refractory material may be reinforced with metal fibers, e.g., stainless steel, such as by way of example and not limitation, 430ss, 310ss and/or 304ss fibers.

Figure 12:
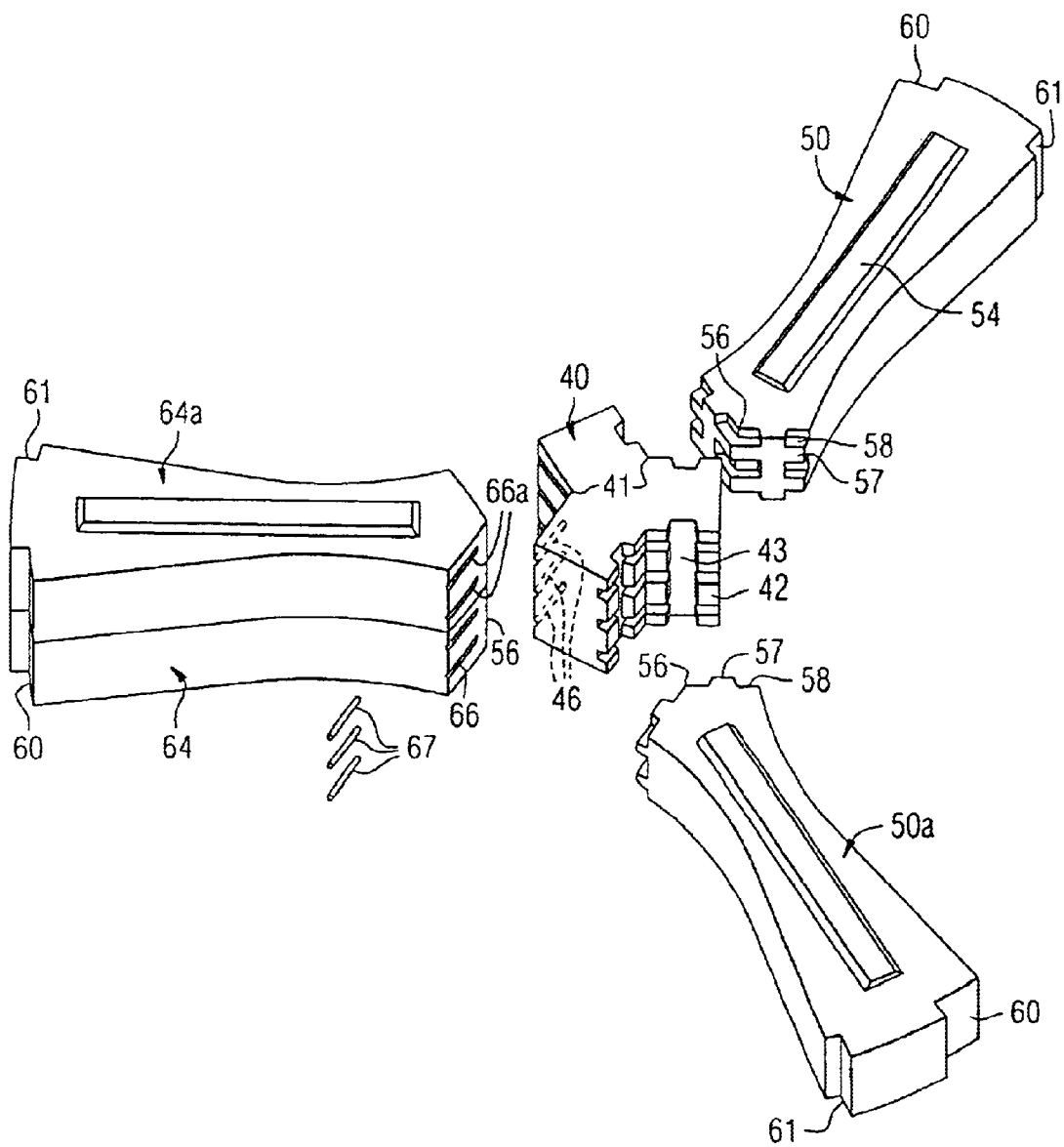
FIG. 12 is an exploded isometric view illustrating the assembly of a heat exchanger hub and heat exchanger legs in accordance with an embodiment of the present invention.

FIG. 12 is an exploded isometric view illustrating the arrangement of the hub 40 and the legs 50, 50a, 64 and 64a. The leg protrusions 57 fit within the hub recesses 43. Similarly, the hub protrusions 42 fit within the leg recesses 58. In this manner, the legs 50 and 50a interlockingly engage with their respective hub recesses 41.

As shown in FIG. 12, the extended tip 56 of the leg 64 fits within its corresponding recess 41 of the hub 40. In the installed position, the pin slots 66, 66a of the leg 64 are aligned with the pin slots 46 of the hub 40. When the slots 66, 66a and 46 are aligned, pins 67 may be inserted in the slots in order to provide additional securement between the leg 64 and hub 40. The pins 67 preferably have diameters of from about 1 to about 2 inches, and lengths of from about 2 to about 6 inches. The pins 67 may be made of any suitable material such as Inconel 600 series or stainless steel 300 series alloys.

As shown in the embodiment of FIG. 12, the hub 40 has a height which is 50% greater than the height of each of the legs 50, 50a and 64. When multiple hubs 40 are installed along the axial length of the rotary kiln, and multiple legs are installed along the length of the kiln, the difference in height between the hubs and the legs results in an arrangement of two hubs for every three sets of legs. This interlocking staggered arrangement provides additional structural integrity for the heat exchanger.

Figure 13:
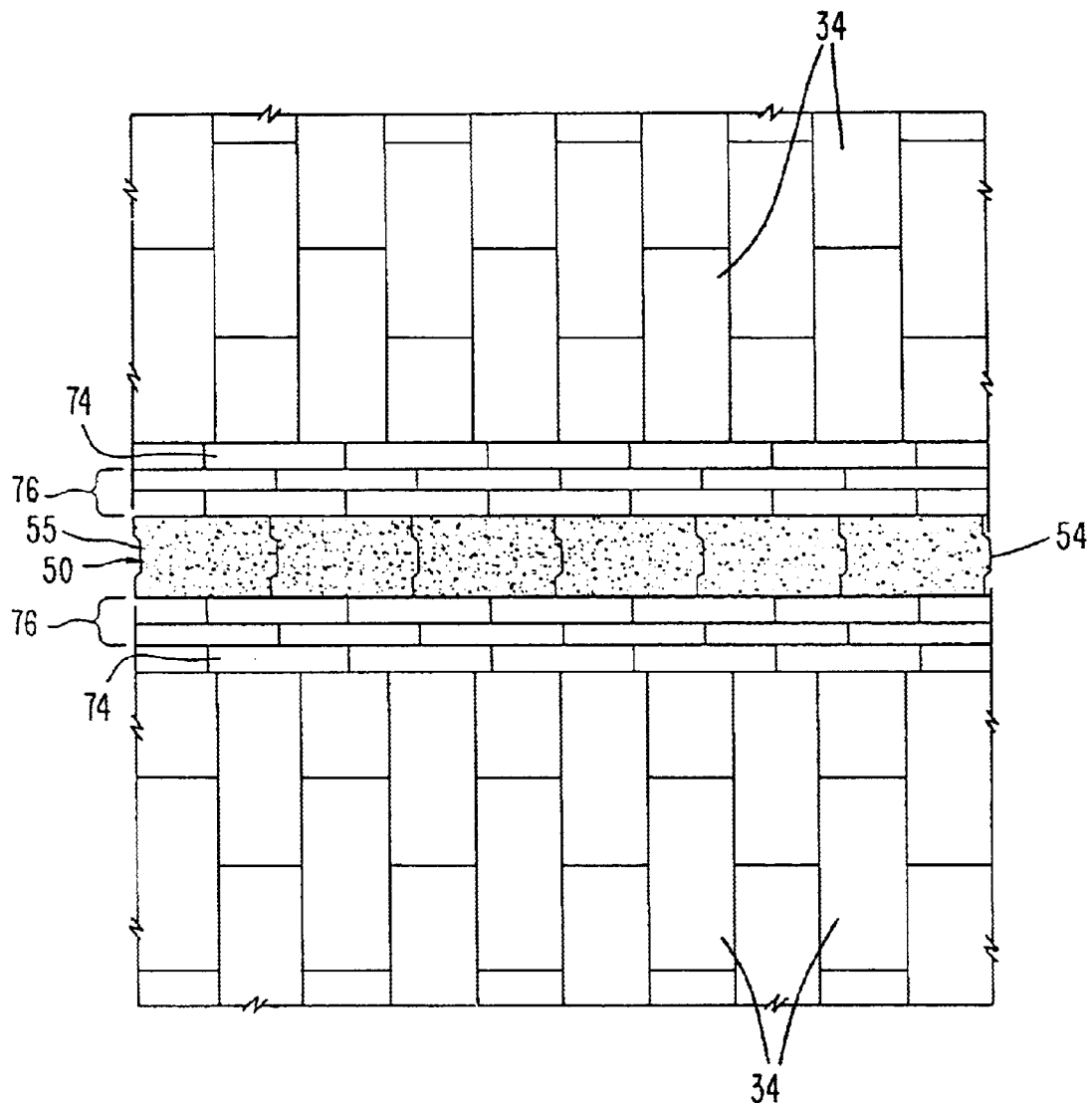
FIG. 13 is a partial sectional view taken through section 13—13 of FIG. 2, illustrating raised courses of bricks between a heat exchanger leg and a refractory brick lining of a rotary kiln.

FIG. 13 is a sectional view taken through section 13—13 of FIG. 2, illustrating a series of heat exchanger legs 50 (shown in cross section) installed in the refractory brick lining 34. Two courses of raised bricks 76 are installed on each side of the legs 50. Another course of raised bricks 74 is installed between the first two courses of raised bricks 76 and the refractory brick lining 34 on both sides of the legs 50. The raised brick courses 74 and 76 are preferably staggered as shown in FIG. 13 in order to prevent materials being treated in the kiln from infiltrating the joints between the bricks, and to reduce or eliminate fracturing of the bricks and legs. As shown most clearly in FIG. 2, the first raised brick course 76 is of greater height than the second raised brick course 74 which, in turn, is greater in height than the refractory brick lining 34. The height of the first raised brick course 76 is preferably from about 9 to about 15 inches, while the height of the second raised brick course 74 is preferably from about 7 to about 12 inches. The height of the lining 34 preferably ranges from about 6 to about 9 inches. The raised brick courses 74 and 76 provide additional material to support the legs 50, 50a and 64 in regions of high stress concentration, thereby reducing or eliminating cracking of the legs.

Figure 14:
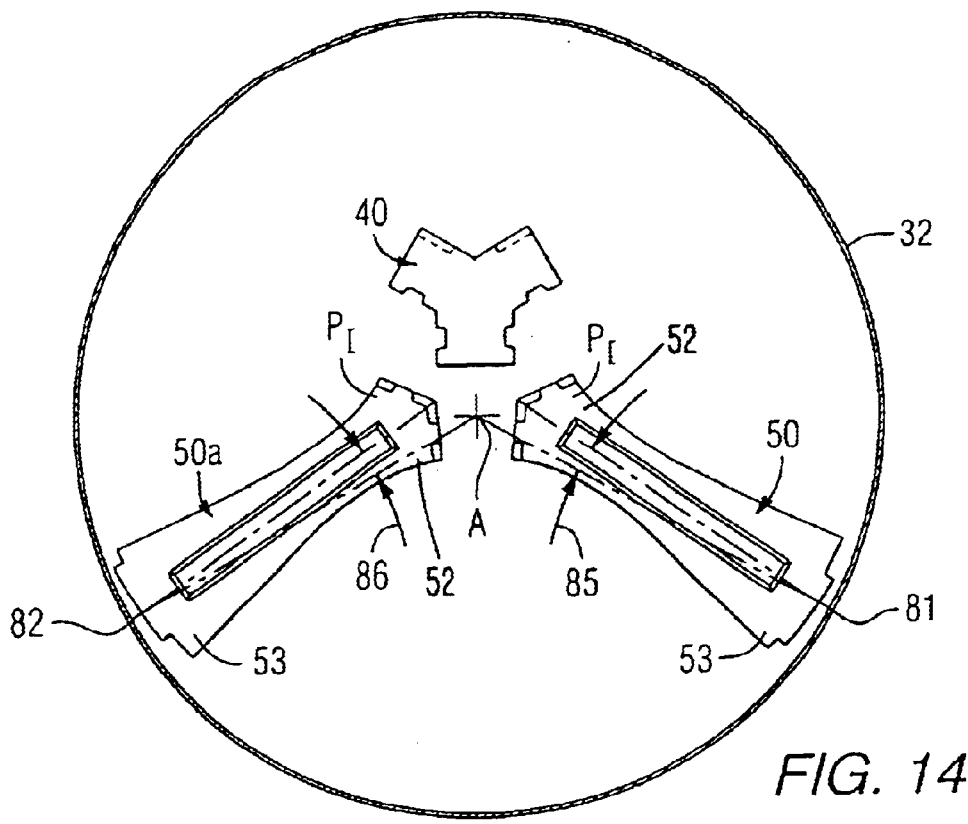
FIGS. 14–17 illustrate sequential steps for installing a heat exchanger in a rotary kiln shell in accordance with an embodiment of the present invention.

FIGS. 14–17 illustrate sequential steps for installing a heat exchanger in the rotary kiln shell 32 in accordance with an embodiment of the present invention. As shown in FIG. 14, the first leg 50 is positioned in the shell 32 with its outer end 53 located at a four o'clock position 81. The initial position of the leg 50 is designated as $P_1$ in FIG. 14. The axial center A of the rotary kiln shell 32 is shown in FIG. 14. The initial position $P_1$ of the first leg 50 is inclined at an angle, designated 85 in FIG. 14, with respect to the axial center A of the shell 32. FIG. 14 also illustrates an initial position $P_1$ of the second leg 50a. The outer end 53 of the second leg 50a is located at an eight o'clock position 82 of the shell 32. In its initial position $P_1$, the second leg 50a is inclined at an angle, designated 86 in FIG. 14, with respect to the center axis A of the shell 32. The angles 85 and 86 preferably range from about 2 to about 8 degrees.

Figure 15:
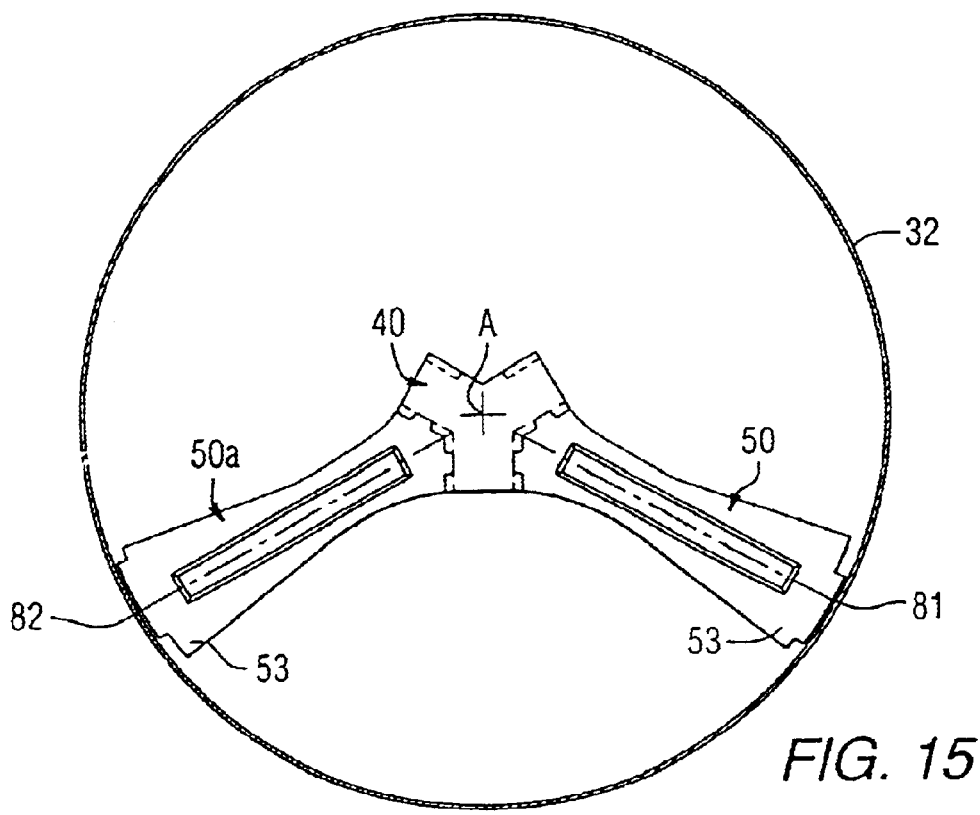

With the first and second legs 50 and 50a located at their respective initial positions Pi, there is sufficient clearance between the legs for insertion of the hub 40. The first and second legs 50 and 50a and the hub 40 may be moved from the positions shown in FIG. 14 to the interlocking positions shown in FIG. 15. The first leg 50 is rotated about a point that substantially corresponds with the four o'clock position 81. Similarly, the second leg 50a rotates about a point substantially corresponding with the eight o'clock position 82. The hub 40 is moved from the elevated position shown in FIG. 14 to the position shown in FIG. 15, at which the center of the hub 40 substantially corresponds with the axial center A of the shell 32. The first and second legs 50 and 50a and the hub 40 are thus moved from their initial positions as shown in FIG. 14 to their installed positions as shown in FIG. 15.

Figure 16:
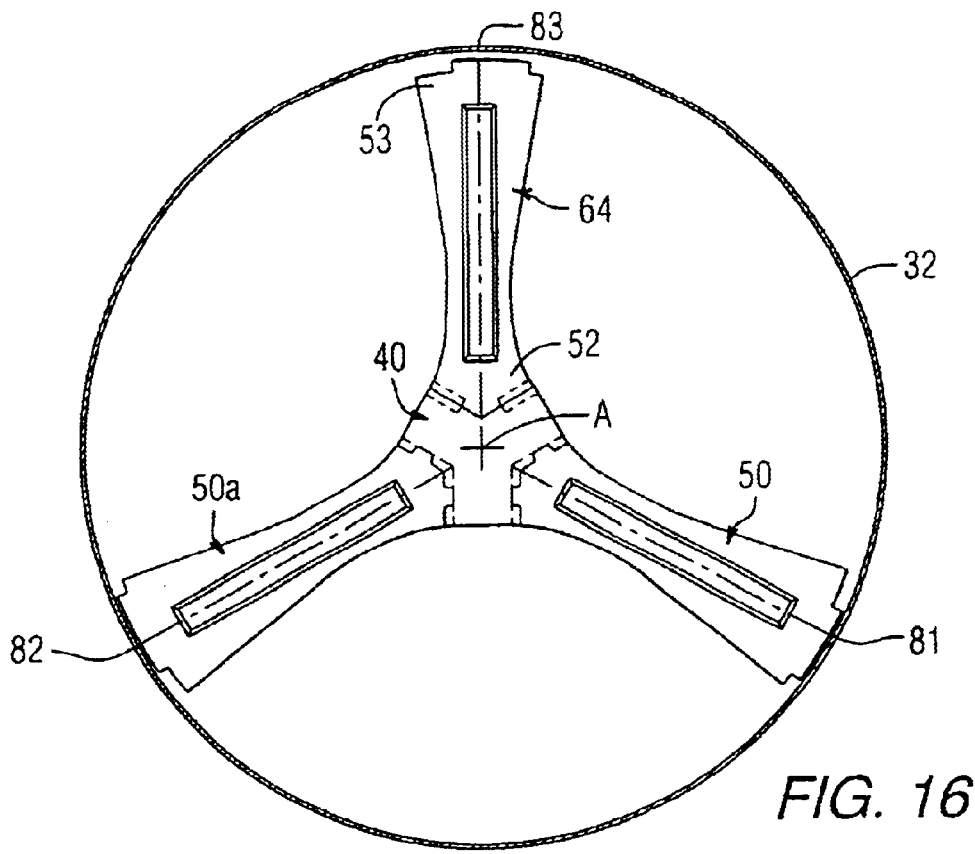

FIG. 16 illustrates the subsequent installation of the third leg 64 in the shell 32. The outer end 53 of the third leg 64 is installed at the twelve o'clock position 83 with respect to the shell 32. The inner end 52 of the third leg 64 is slid into place against the hub 40. The pins 67 (as shown in detail in FIG. 12) may be inserted between the third leg 64 and hub 40 to thereby form an interlocking engagement between the third leg 64 and the hub 40.

As will be appreciated by those skilled in the art, kiln shells are not perfectly cylindrical. Thus, when forming legs 50, 50a and 64, it will be necessary to dimension such components to fit within the smallest cylindrical opening defined by the kiln shell. As a result, the insertion of shims between the outer ends of legs 50, 50a and 64 and kiln shell 32, may be required for one or many of such legs 50, 50a and 64.

In one method of forming legs 50, 50a and 64, such legs are dimensioned shorter than necessary to fit within a given kiln shell, and the legs are then shimmed where necessary to account for areas of kiln shell 32 that are out of round.

Figure 17:
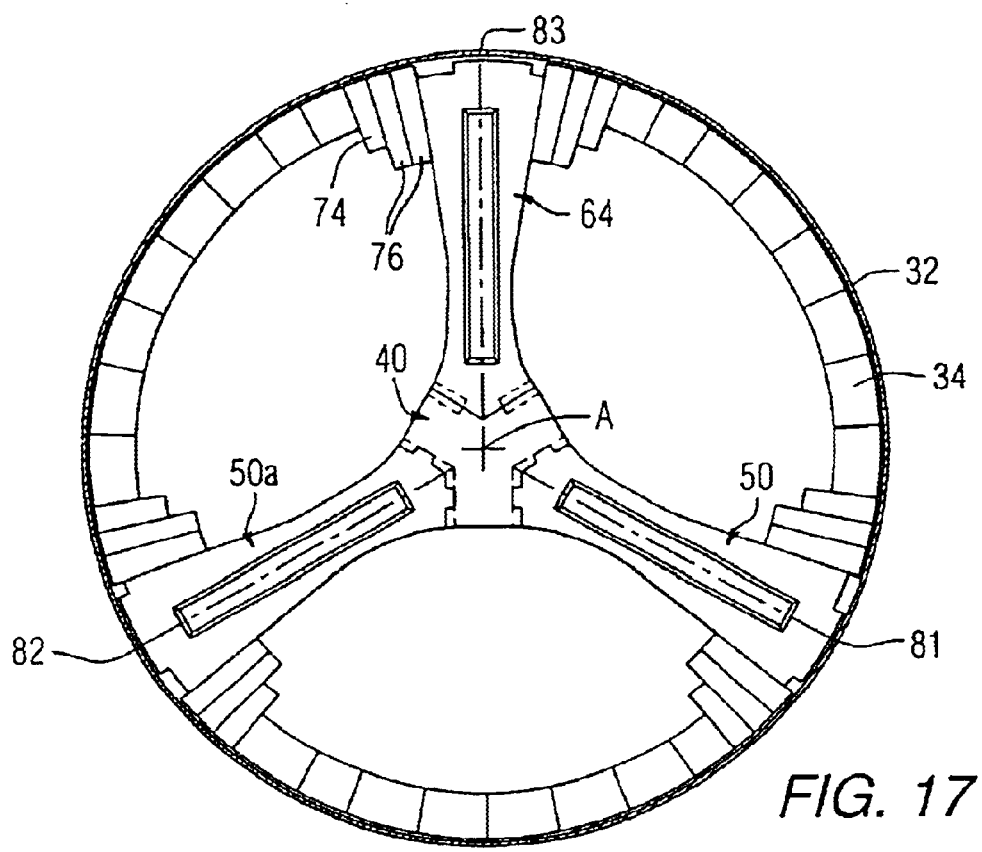

As shown in FIG. 17, after installation of the first, second and third legs 50, 50a and 64, and the hub 40, the refractory brick lining 34 is installed against the shell 32, as well as the raised brick courses 74 and 76.

The following example is intended to illustrate various aspects of the present invention, but is not intended to limit the scope of the invention.

EXAMPLE

A heat exchanger is installed in a rotary kiln as follows. After the internal surface of the kiln shell has been exposed and cleaned, the following sequence is carried out.

1. enter kiln and establish a longitudinal centerline on the lowest segment of radius, or 6 o'clock position;
2. measure interior circumference and divide circumference first by one-half and record, then divide the circumference by thirds and record;
3. from the first centerline on floor, measure one-half of the circumference and establish upper point at the 12 o'clock position. From this line measure back down shell both to the left and right one-third of the circumference and establish these centerlines, at approximately the 4 o'clock and 8 o'clock positions;
4. at the 6 o'clock position, set track segments for the rolling support table, the full length of work area;
5. set both monorail segments, approximately 20 degrees to the left and 20 degrees to the right of the upper or 12 o'clock position centerline;
6. establish the starting point of the heat exchanger and mark kiln shell;
7. from each of the three centerlines, at 12 o'clock, 4 o'clock and 8 o'clock positions, set the support channels and weld to shell;
8. set one leg on the left side of a support table, and second leg on the right side of the table, then raise table to up position;
9. set a hub in place on the support table and lower these three items into place;
10. with support table in the down position, set the remaining leg into place and install locking pins; and
11. lower table, roll forward to next position and repeat steps #8, #9 and #10.

This sequence is continued until the heat exchanger is completely installed. Then the support table track and monorail segments are removed and the remaining kiln brick lining is installed.

Whereas particular embodiments of this invention have been described above for purposes of illustration, it will be evident to those skilled in the art that numerous variations of the details of the present invention may be made without departing from the invention as defined in the appended claims.

What is claimed is:

1. A rotary kiln comprising:
   a refractory lining in the kiln; and
   a heat exchanger assembly in the kiln including a heat exchanger hub comprising recesses, and heat exchanges legs received in the heat exchanger hub recesses wherein the legs are installed adjacent to the refractory lining with at least one course of raised bricks.

2. A rotary kiln comprising:
   a refractory lining in the kiln; and
   a heat exchanger assembly in the kiln including a heat exchanger hub comprising recesses, and heat exchanger legs received in the heat exchanger hub recesses, wherein the legs are installed adjacent to the refractory lining with at least two courses of raised bricks, and the courses of raised bricks have different heights.

3. A method of installing a heat exchanger in a rotary kiln comprising:
   positioning first and second heat exchanger legs in the kiln at initial positions;
   installing a hub between the first and second legs by moving the first and second legs from their initial positions to installed positions in which the first and second legs are engaged with the hub; and
   installing a third heat exchanger leg by engaging the third heat exchanger leg with the hub.

4. The method of claim 3, wherein the first and second heat exchanger legs are positioned at four o'clock and eight o'clock positions, respectively.

5. The method of claim 3, wherein the third heat exchanger leg is installed at a twelve o'clock position.

6. The method of claim 3, wherein at least one of said first and second heat exchanger legs includes recesses and projections dimensioned to engage and interlock with projections and recesses an said hub.

7. The method of claim 6, wherein a third heat exchanger leg slides into position relative to said hub.

8. The method of claim 6 further comprising the step of inserting shims between said kiln and the outer end of at least one of said heat exchanger legs.

9. The method of claim 3, wherein at least one of said heat exchanger legs includes recesses and projections dimensioned to engage and interlock with projections and recesses on said hub, and at least one of said heat exchanger legs is pinned to said hub.

10. A trefoil structure for a rotary kiln, said kiln having a cylindrical body having a metal shell and a refractory brick lining therewithin, said trefoil structure, comprising:
    a central hub comprised of a plurality of side-by-side, pre-formed refractory hub sections, said hub sections aligned along a central axis that extends through said cylindrical body; and
    a plurality of legs extending radially outward from said hub to said metal shell, each of said legs comprised of side-by-side pre-formed leg sections, each of said leg sections being a unitary cast refractory shape that extends between said central hub and supports on said metal shell.

11. A trefoil structure of claim 10, wherein said hub sections are axially thicker than said leg sections, wherein each hub section engages at least two side-by-side leg sections.

12. A trefoil structure of claim 11, wherein shims are disposed between said metal shell and at least one of said legs.

13. A trefoil structure of claim 10, wherein the leg sections that form at least one of said legs are axially slidable into engagement with said hub sections forming said hub.

14. A trefoil structure of claim 13, wherein said leg sections are pinned to said hub sections.

15. A trefoil structure of claim 10, wherein at least one of said legs is comprised of leg sections that have innermost ends that interlockingly engage with said hub sections, and at least one of said legs is comprised of leg sections that have innermost ends that slide axially along the central axis of said cylindrical body into engagement with said hub sections.

16. A trefoil structure of claim 15, wherein said leg sections that slide into engagement with said hub sections are locked in position by pins extending into aligned slots in said slidably-aligned leg sections and said hub sections.

17. A trefoil structure of claim 15, wherein said leg sections that interlock with said hub sections have a plurality of recesses and protrusions formed along said innermost end of said leg sections that mate with opposing protrusions and recesses on said hub sections.

18. A trefoil structure for a rotary kiln, said kiln having a cylindrical body having a metal shell and a refractory brick lining therewithin, said trefoil structure, comprising:

a refractory hub oriented along an axis that extends axially through said cylindrical body; and a plurality of elongated leg sections that extend radially from said hub to said metal shell, each of said leg sections being an elongated cast refractory shape dimensioned to have an innermost end that engages and interlocks with said hub and an outermost end supported by said metal shell of said cylindrical body.

19. A trefoil structure of claim 18, wherein groups of said leg sections are arranged side-by-side to form a plurality of equally spaced trefoil legs that extend from said hub to said metal shell.

20. A trefoil structure of claim 19, wherein each of said leg sections includes a protrusion on one lateral side and a recess on another lateral side, said protrusion and said recess being dimensioned, wherein a protrusion on one leg section is matingly received in a recess in another leg section when multiple leg sections are arranged side-by-side to form a trefoil leg.

21. A trefoil structure of claim 20, wherein said hub is comprised of a plurality of side-by-side pre-formed refractory hub sections.

22. A trefoil structure of claim 21, wherein a hub section is thicker than a leg section, wherein each hub section engages at least two side-by-side leg sections.

23. A trefoil structure of claim 18, wherein said leg sections are supported by said metal shell by elongated bars attached to said metal shell, said bars being received in channels formed in the outermost ends of said leg sections.

24. A trefoil structure of claim 23, wherein said channels are formed in the edge of said leg sections.

25. A trefoil structure of claim 18, wherein shims are disposed between said metal shell and the outermost end of at least one of said leg sections.

* * * * *